United States Patent [19]

Evans

[11] Patent Number: 5,661,920

[45] Date of Patent: Sep. 2, 1997

[54] SCOPE COVER

[76] Inventor: Daniel D. Evans, 3234 N. 20th Pl., Phoenix, Ariz. 85016

[21] Appl. No.: 555,146

[22] Filed: Nov. 8, 1995

Related U.S. Application Data

[63] Continuation-in-part of Ser. No. 26,116, Jun. 27, 1994, abandoned.

[51] Int. Cl.$^6$ ............................................. F41A 35/02
[52] U.S. Cl. ........................... 42/96; 42/101; 33/244; 150/154
[58] Field of Search ..................... 42/96, 101, 103, 42/83; 33/244; 150/154; 206/317

[56] References Cited

U.S. PATENT DOCUMENTS

| D. 348,356 | 7/1994 | Nemoto | D3/267 |
|---|---|---|---|
| 557,011 | 3/1896 | Murray | 150/154 |
| 1,736,383 | 11/1929 | Waggoner | 160/154 |
| 2,554,199 | 5/1951 | Lewis | 150/154 |
| 2,872,960 | 2/1959 | Kolpin | 42/96 |
| 3,145,617 | 8/1964 | Gondek | 42/96 |
| 5,183,953 | 2/1993 | Anderson et al. | 42/96 |

FOREIGN PATENT DOCUMENTS

| 22346 | 6/1921 | France | 42/96 |

*Primary Examiner*—Stephen M. Johnson
*Attorney, Agent, or Firm*—H. Gordon Shields

[57] ABSTRACT

Scope cover apparatus includes a generally cylindrical element made of stretchable material with end pieces and with a relatively narrow and elongated opening through which a scope fits into the scope cover. The material out of which the scope cover is made is elastic enough to stretch to fit onto a scope and yet to substantially cover the scope when the scope cover is placed on the scope for maximum protection.

2 Claims, 1 Drawing Sheet

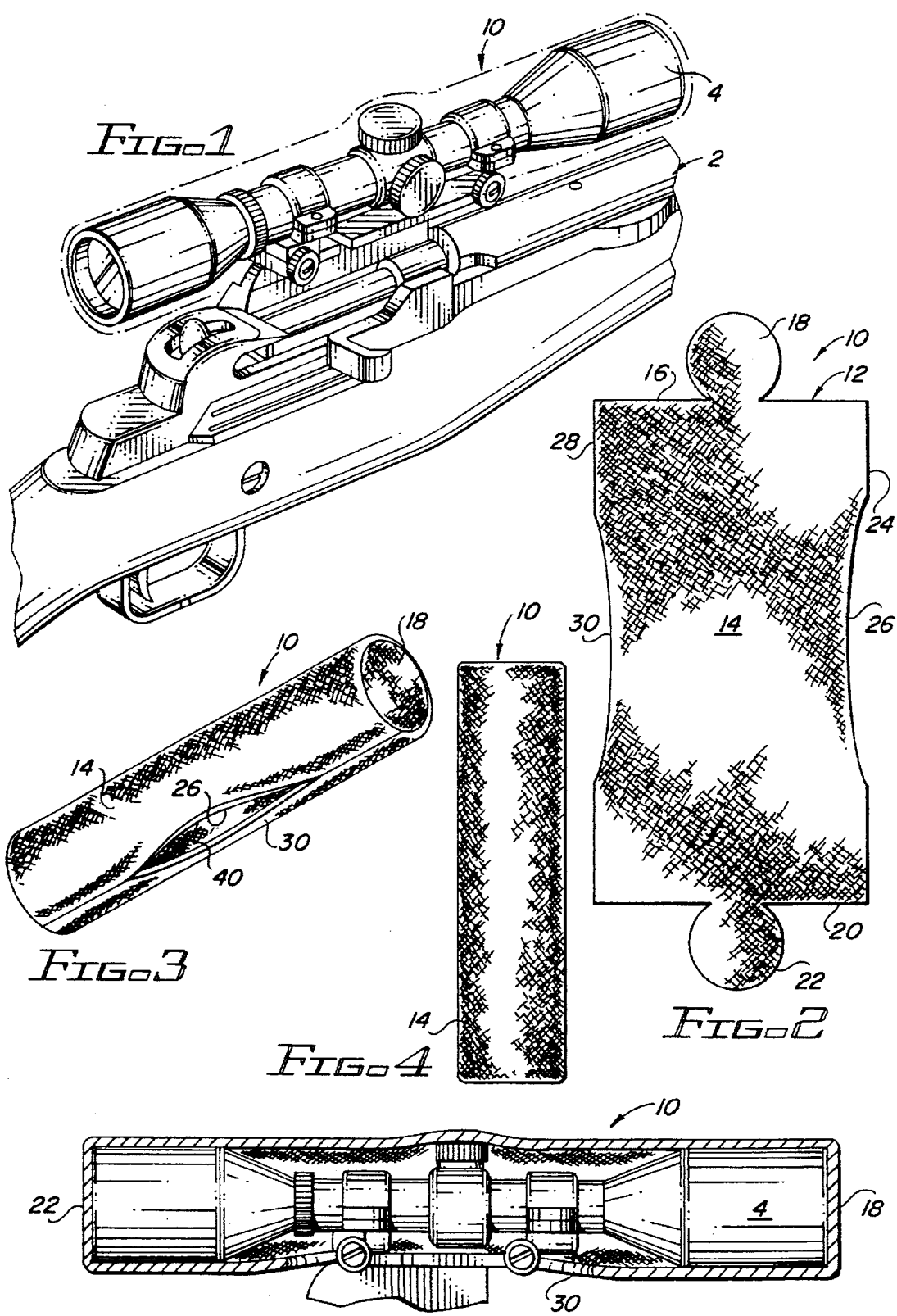

SCOPE COVER

This application is a continuation-in-part application of Ser. No. 29/026,116, filed Jun. 27, 1994 now abandoned.

BACKGROUND OF THE INVENTION

1. Field of the Invention

This invention relates to covers for telescopic sights, hereinafter simply referred to as "scopes", for rifles, and, more particularly, to a generally cylindrical scope cover designed to quickly be secured to and removed from a scope.

2. Description of the Prior Art

U.S. Pat. No. 5,183,953 (Anderson) discloses a flexible cover for a scope and which is a generally elongated and tapering half cylinder configuration and designed to be secured to a scope by means of rubber bands and the like.

U.S. Pat. No. Des. 348,356 (Nemoto) discloses a case for a spotting scope. The scope is demounted from a stand, or the like, and is enclosed in the somewhat tubular case. The general configuration is somewhat cylindrical with a tapering front end and with a zipped opening extending rearwardly from the front taper and extending up the rear end of the case.

The '356 apparatus is designed for a scope which is not mounted, and accordingly cannot be used with a scope mounted on a rifle. The '953 patent cannot be easily removed from a scope due to the use of the rubber bands in securing the cover to the scope. Moreover, due to the open bottom, the scope is not fully enclosed within the scope cover.

The apparatus of the present invention substantially completely encloses the scope and, at the same time, is easily and quickly removable from a scope.

SUMMARY OF THE INVENTION

The scope cover described and claimed herein comprises a generally cylindrical tubular element with a double concaved opening at the bottom through which the cover is mounted onto and removed from a scope.

Among the objects of the present invention are the following:

To provide new and useful cover apparatus for a scope;

To provide new and useful cover apparatus for substantially fully enclosing a scope;

To provide new and useful cover apparatus which is easily and quickly mounted on and removed from a scope; and To provide new and useful cover apparatus for a scope having a generally cylindrical configuration.

BRIEF DESCRIPTION OF THE DRAWING

FIG. 1 comprises a perspective view of the use environment of the apparatus of the present invention.

FIG. 2 is a plan view of a blank from which the apparatus of the present invention is fabricated.

FIG. 3 is a perspective view of the apparatus of the present invention made from the blank illustrated in FIG. 2.

FIG. 4 is a top view of the apparatus of FIG. 3.

FIG. 5 is a side view of the apparatus of the present invention in its use environment.

DESCRIPTION OF THE PREFERRED EMBODIMENT

FIG. 1 is a perspective view of a portion of a rifle 2 showing a telescopic sight or scope 4 for mounting on the top of the receiver of the rifle 2. The apparatus of the present invention is designed to cover the scope 4 as shown in FIG. 1. In dash dot line, a scope cover apparatus 10 is indicated about the scope 4.

FIG. 2 comprises a plan view of a blank 12 used to fabricate the scope cover apparatus 10 of the present invention. The scope cover 10 in its finished configuration is shown in FIG. 3. FIG. 3 comprises a perspective view of the scope cover apparatus 10. FIG. 4 is a top view of the scope cover illustrated in FIG. 3 after fabrication from the blank 12 of FIG. 2. For the following discussion reference will primarily be made to FIGS. 2, 3, and 4.

The blank 12 out of which the scope cover apparatus 10 is made, includes a generally rectangular body 14 having a top edge 12 and a bottom edge 20. The edges 12 and 20 are generally parallel to each other. Extending outwardly from the top edge 12 is a circular end piece 18. Extending outwardly from a bottom edge 20 is a circular end piece 22.

A pair of sides 24 and 28 extend between the edges 16 and 20. The sides 24 and 28 are generally parallel to each other and are generally perpendicular to the edges 16 and 20.

A relatively shallow concavity 26 extends inwardly on the side 24, and a like concavity 30 extends inwardly from the side 28. The scope cover apparatus 10 is generally symmetrical about a line drawn longitudinally between and bisecting the circular end pieces 18 and 22. The scope cover 10 is also generally symmetrical about a line bisecting the concavities 26 and 30. The concavities 26 and 30 comprise opposite sides of an opening 40 by which the finished scope cover apparatus 10 is secured over the scope 4. Or, phrasing it in the opposite manner, the scope 4 extends into the cover apparatus 10 through the opening 40 defined by the concavities 26 and 30.

In fabrication, the edges 24 and 28 are appropriately secured together, leaving only the concavities 26 and 30 facing each other to define the opening 40, best shown in FIG. 3, through which the scope 4 moves into the cover apparatus 10. The top edge 12 is appropriately secured to the circular end piece 18, and the bottom edge 20 is appropriately secured to the circular end piece 22 to complete the fabrication process. Thus, when completed, there is a generally cylindrical element provided with an opening 40 which extends generally longitudinally of the cylinder. The opening 40 comprises a relatively long but narrow opening which has a somewhat pointed ended oval-like configuration.

The blank 10 out of which the apparatus is made preferably includes a nylon outer skin, a nylon inner skin, with neoprene material between the inner and outer skins. The neoprene material comprises padding for the scope 4, and the nylon inner skin provides a relatively slippery surface so as not to have frictional problems with the scope 4, and with any of the elements associated with the scope.

Furthermore, the scope cover 10 is not designed to be waterproof, but rather to help remove water from the scope apparatus. That is, any moisture will be drawn away from the scope by the cover apparatus 10.

The neoprene and nylon material out of which the scope cover 10 is made is somewhat stretchable, or elastic, as well as, of course, being rather flexible. This allows the scope cover to stretch, as needed, to fit over the scope 4. At the same time, the scope cover 20 will remain in place, and held thereon, by the inherent elasticity of the material out of which the cover apparatus is made.

FIG. 5 comprises a view in partial section through the scope cover 10 showing the scope cover 10 in place over the scope 4. The ends of the scope 4 are disposed against the end pieces 18 and 22, and the concavity 30 is shown at the bottom of the scope. The cover apparatus 10 is secured to the scope through the opening 40 defined by the concavity elements or edges 26 and 30.

It will be noted, from FIG. 5, that the scope 4 is substantially completely enclosed by the scope cover apparatus 10, thus providing maximum protection to the scope.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. A cover for a mounted telescopic sight comprising in combination:

a first end piece;

a second end piece generally parallel to and spaced apart from the first end piece;

a generally cylindrical element extending between and secured to the first and second end pieces;

a longitudinally extending opening in the cylindrical element having a generally elongated and pointed ended oval configuration through which the telescopic sight extends to be disposed within the cover.

2. The cover of claim 1 in which the end pieces and the cylindrical element are made of foam rubber having a nylon exterior and a nylon interior.

* * * * *